US011019896B1

(12) United States Patent
Piper et al.

(10) Patent No.: US 11,019,896 B1
(45) Date of Patent: Jun. 1, 2021

(54) CASE FOR PORTABLE ELECTRONIC COMPUTING TABLET DEVICE

(71) Applicant: Pioneer Square Brands, Inc., Seattle, WA (US)

(72) Inventors: Brian Lewis Piper, Seattle, WA (US); Michael Cooper Ferren, Camus, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/075,358

(22) Filed: Oct. 20, 2020

Related U.S. Application Data

(62) Division of application No. 16/805,693, filed on Feb. 28, 2020, now Pat. No. 10,849,397.

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/003* (2013.01); *A45C 2200/15* (2013.01)

(58) Field of Classification Search
CPC .............. A45C 11/00; A45C 2011/003; A45C 2200/15; H04B 1/3888
See application file for complete search history.

(56) References Cited

U.S. PATENT DOCUMENTS

| 4,669,285 | A  | * | 6/1987 | Kim ........................ | E05B 37/12 70/312 |
| 2012/0037285 | A1 | * | 2/2012 | Diebel .................. | G06F 1/1628 150/165 |
| 2015/0001105 | A1 | * | 1/2015 | Nyholm ................ | G06F 1/1628 206/45.2 |
| 2015/0194998 | A1 | * | 7/2015 | Fathollahi ............ | H04B 1/3877 455/575.8 |

* cited by examiner

*Primary Examiner* — Yuwen Pan
*Assistant Examiner* — Angelica M Perez
(74) *Attorney, Agent, or Firm* — Grandview Law

(57) ABSTRACT

Systems and methods are involved with but are not limited to an apparatus including a frame assembly including a first frame coupler positioned along the frame assembly periphery first outer side of the frame assembly periphery outer surface, a second frame coupler positioned nearer to the frame assembly periphery fourth outer side than to the frame assembly periphery second outer side, the second frame coupler extending from the frame back exterior surface, and a third frame coupler positioned nearer to the frame assembly periphery second outer side than to the frame assembly periphery fourth outer side, the third frame coupler extending from the frame back exterior surface. In addition, other aspects are described in the claims, drawings, and text forming a part of the present disclosure.

14 Claims, 11 Drawing Sheets

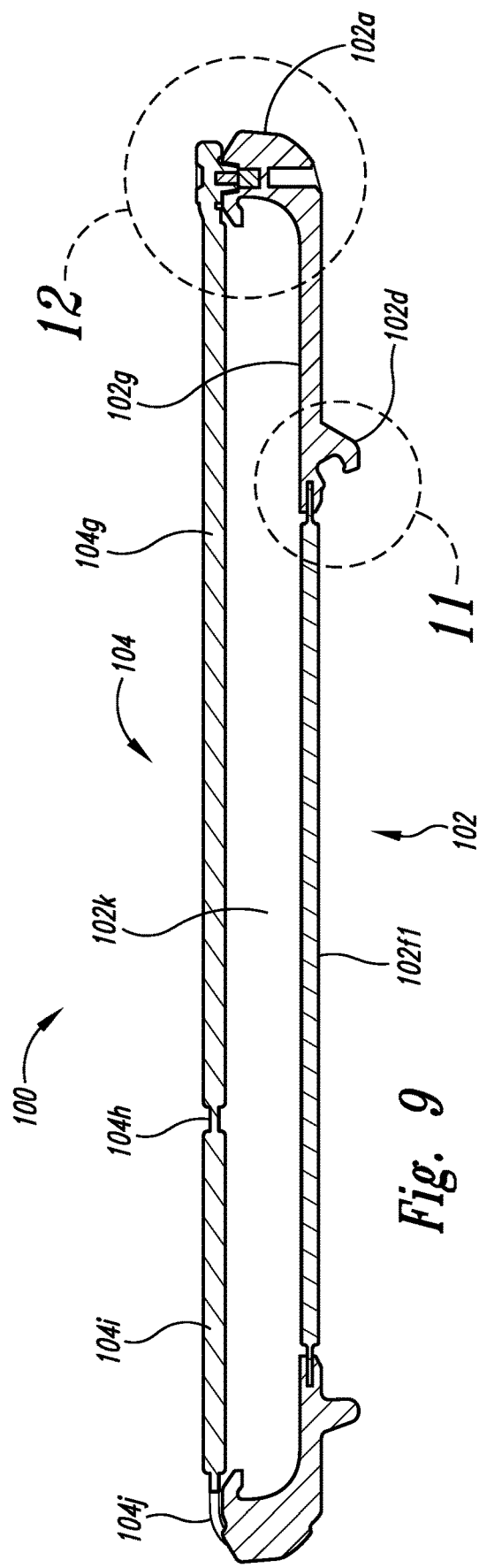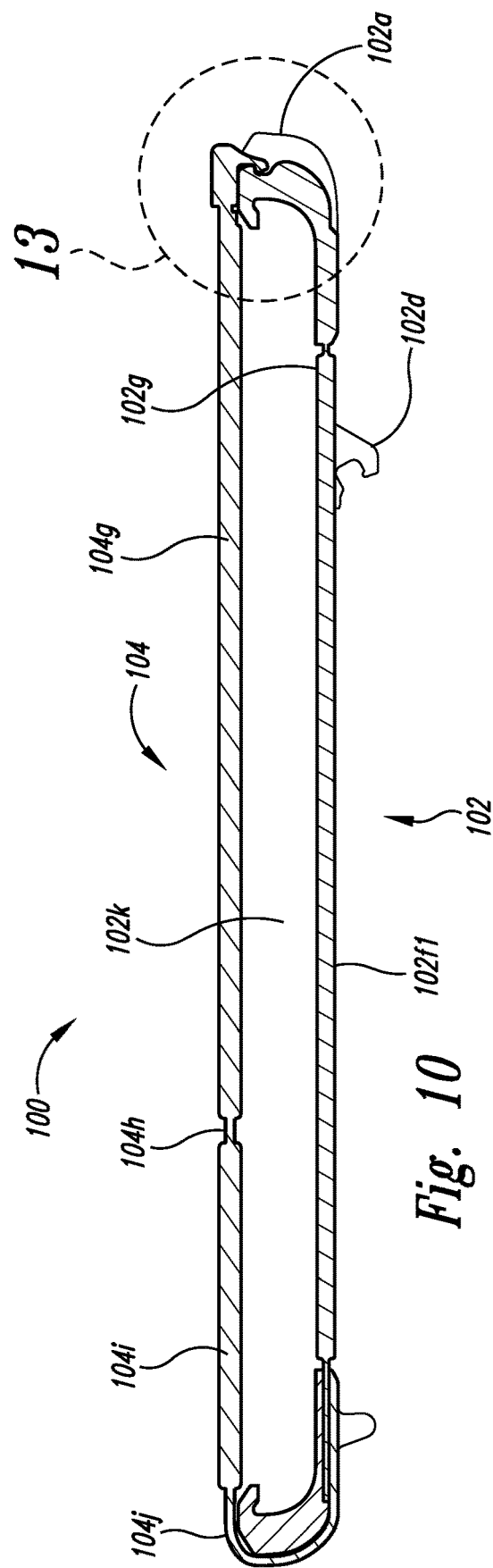

CASE FOR PORTABLE ELECTRONIC COMPUTING TABLET DEVICE

SUMMARY

In one or more aspects, an apparatus includes, but is not limited to a tablet case assembly including a frame assembly including a frame assembly periphery and a frame back, the frame assembly periphery including a frame assembly periphery first surface, a frame assembly periphery second surface, and a frame assembly periphery outer surface, the frame assembly periphery outer surface including a frame assembly periphery first outer side, a frame assembly periphery second outer side, a frame assembly periphery third outer side, and a frame assembly periphery fourth outer side, the frame assembly periphery first outer side substantially perpendicular to the frame assembly periphery second outer side and to the frame assembly periphery fourth outer side, the frame assembly periphery first outer side substantially parallel to the frame assembly periphery third outer side, the frame back including a frame back exterior surface facing a first direction substantially as what the frame assembly periphery first surface is facing and including a frame back interior surface facing a second direction substantially opposite to the first direction, the second direction substantially as what the frame assembly periphery second surface is facing, the frame assembly periphery bounding the frame back interior surface to together form a tablet receptacle portion sized and shaped to contain a tablet computing device, the frame assembly including a first frame coupler positioned along the frame assembly periphery first outer side of the frame assembly periphery outer surface, a second frame coupler positioned nearer to the frame assembly periphery fourth outer side than to the frame assembly periphery second outer side, the second frame coupler extending from the frame back exterior surface, a third frame coupler positioned nearer to the frame assembly periphery second outer side than to the frame assembly periphery fourth outer side, the third frame coupler extending from the frame back exterior surface, a fourth frame coupler positioned along the frame assembly periphery second surface nearer to the frame assembly periphery second outer side than to the frame assembly periphery fourth outer side, a fifth frame coupler interiorly positioned within the fourth frame coupler, a sixth frame coupler positioned along the frame assembly periphery second surface nearer to the frame assembly periphery fourth outer side than to the frame assembly periphery second outer side, and a seventh frame coupler, interiorly positioned within the sixth frame coupler; and a cover assembly including a first cover portion and a second cover portion, the first cover portion including a first side, a second side and a third side, the first side being substantially perpendicular to the second side and to the third side, the cover assembly including a first hinge, the first side coupled with the first hinge, the first cover portion including a cover end edge positioned oppositely across the first cover portion from the first side, the cover assembly including a first cover coupler positioned substantially along the cover end edge nearer to the third side than to the second side, a second cover coupler positioned nearer to the cover end edge than to the first side, the second cover coupler positioned nearer to the third side than to the second side, a third cover coupler portion positioned substantially along the cover end edge nearer to the second side than to the third side, a fourth cover coupler portion positioned nearer to the cover end edge than to the first side, the fourth cover coupler portion positioned nearer to the second side than to the third side, a fifth cover coupler positioned nearer to the cover end edge than to the first side, the fifth cover coupler positioned nearer to the third side than to the second side, a sixth cover coupler positioned nearer to the cover end edge than to the first side, the sixth cover coupler positioned nearer to the third side than to the second side, the sixth cover coupler interiorly positioned within the fifth cover coupler, a seventh cover coupler positioned nearer to the cover end edge than to the first side, the seventh cover coupler positioned nearer to the second side than to the third side, an eighth cover coupler positioned nearer to the cover end edge than to the first side, the eighth cover coupler positioned nearer to the second side than to the third side, the eighth cover coupler interiorly positioned within the seventh cover coupler second cover plug, and a ninth cover coupler portion positioned substantially along the cover end edge between the third side and the second side.

In one or more aspects, an apparatus includes, but is not limited to a tablet case assembly including a frame assembly including a tablet receptacle portion sized and shaped to contain a tablet computing device, the frame assembly including a first frame coupler, a fourth frame coupler, a fifth frame coupler interiorly positioned within the fourth frame coupler, a sixth frame coupler and a seventh frame coupler interiorly positioned within the sixth frame coupler; and a cover assembly including a fifth cover coupler, a sixth cover coupler interiorly positioned within the fifth cover coupler, a seventh cover coupler, an eighth cover coupler interiorly positioned within the seventh cover coupler second cover plug, and a ninth cover coupler portion, wherein the cover assembly substantially covers the tablet receptacle portion of the frame assembly in a closed configuration, the closed configuration including the first frame coupler and the ninth cover coupler portion being snap coupled together, the fourth frame coupler and the seventh cover coupler being coupled together by the seventh cover coupler being at least partially positioned interiorly to the fourth frame coupler, the fifth frame coupler and the eighth cover coupler being magnetically coupled together, the sixth frame coupler and the fifth cover coupler being coupled together by the fifth cover coupler being at least partially positioned interiorly to the sixth frame coupler, and the seventh frame coupler and the sixth cover coupler being magnetically coupled together.

In one or more aspects, an apparatus includes, but is not limited to a tablet case assembly including a frame assembly including a second frame coupler, and a third frame coupler; and a cover assembly including a first cover coupler, a second cover coupler, a third cover coupler portion, and a fourth cover coupler portion, wherein the frame assembly and the cover assembly are configured to couple together to form a stand configuration wherein the cover assembly substantially forms a stand to support the frame assembly, the stand configuration including the second frame coupler and the second cover coupler being snap coupled together, the third frame coupler and the fourth cover coupler portion being snap coupled together, the second frame coupler and the first cover coupler being frictionally coupled together, and the third frame coupler and the third cover coupler portion being frictionally coupled together.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of case for portable electronic computing case based articles of manufacture, compositions of matter, systems for producing and/or methods for producing same that may provide context, for instance, in introducing one or more processes and/or devices described herein.

FIG. 9 is a cross-sectional view of the tablet case assembly in closed configuration taken along the 9-9 cut lines of FIG. 8.

FIG. 10 is a cross-sectional view of the tablet case assembly in closed configuration taken along the 10-10 cut lines of FIG. 10.

DETAILED DESCRIPTION

Figure 1:
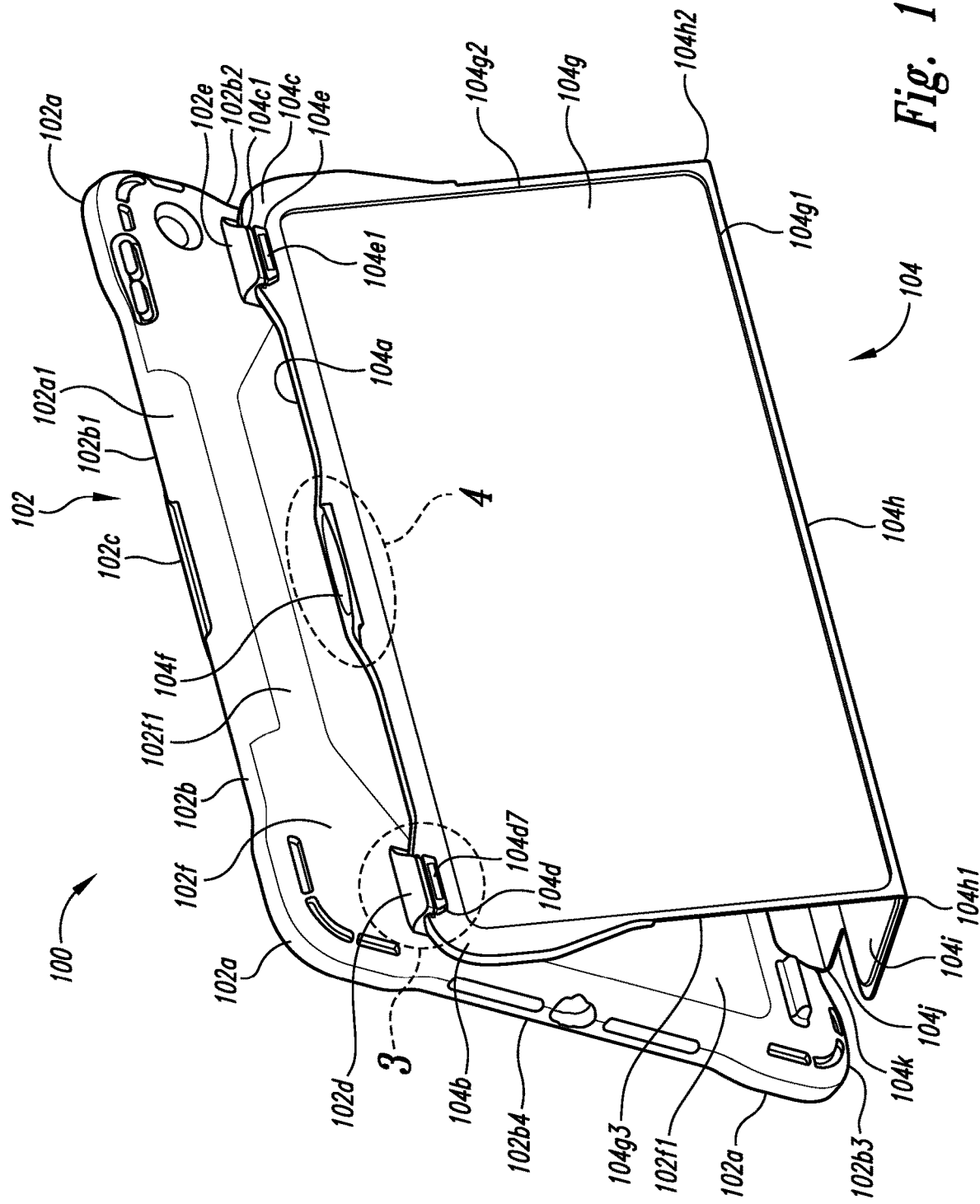
FIG. 1 is a rear perspective view of tablet case assembly in open-stand configuration.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1 depicted therein is a rear perspective view of tablet case assembly 100 shown to include frame assembly 102 and cover assembly 104. The frame assembly 102 is shown to include frame assembly periphery 102a, frame assembly periphery outer surface (e.g., frame assembly periphery outer surface) 102b, first frame coupler (e.g., frame assembly periphery groove) 102c, second frame coupler (e.g., left frame assembly hook) 102d, third frame coupler (e.g., right frame assembly hook) 102e, and frame back 102f. The frame assembly periphery 102a is shown to include frame assembly periphery first face (e.g., frame assembly periphery rear face) 102a1. The frame assembly periphery outer surface (e.g., frame assembly periphery outer surface) 102b is shown to include frame assembly periphery first outer side 102b1, frame assembly periphery second outer side 102b2, frame assembly periphery third outer side 102b3, and frame assembly periphery fourth outer side 102b4. The frame back 102f is shown to include frame back exterior surface 102f1. The cover assembly 104 is shown to include cover end edge 104a, first cover coupler (e.g., left cover corner tab) 104b, third cover coupler portion (e.g., right cover corner tab) 104c, fifth cover coupler (e.g., left cover plug) 104d, seventh cover coupler (e.g., right cover plug) 104e, ninth cover coupler portion (e.g., cover hook) 104f, first cover portion 104g, first hinge 104h, second cover portion 104i, flexible hinge 104j, and second hinge 104k. The fifth cover coupler (e.g., left cover plug) 104d is shown to include sixth cover coupler (e.g., left cover plug magnet) 104d7. The seventh cover coupler (e.g., right cover plug) 104e is shown to include eighth cover coupler (e.g., right cover plug magnet) 104e1. The first cover portion 104g is shown to include first side 104g1, second side 104g2, and third side 104g3. The first hinge 104h is shown to include first corner 104h1, and second corner 104h2. The fourth frame coupler (e.g., left frame socket) 102i is shown to include fifth frame coupler (e.g., left frame socket magnet or non-magnetic metallic portion) 102i5. The sixth frame coupler (e.g., right frame socket) 102j is shown to include seventh frame coupler (e.g., right frame socket magnet or non-magnetic metallic portion) 102j1. In alternative implementations the socket and plug structures are exchanged.

Figure 2:
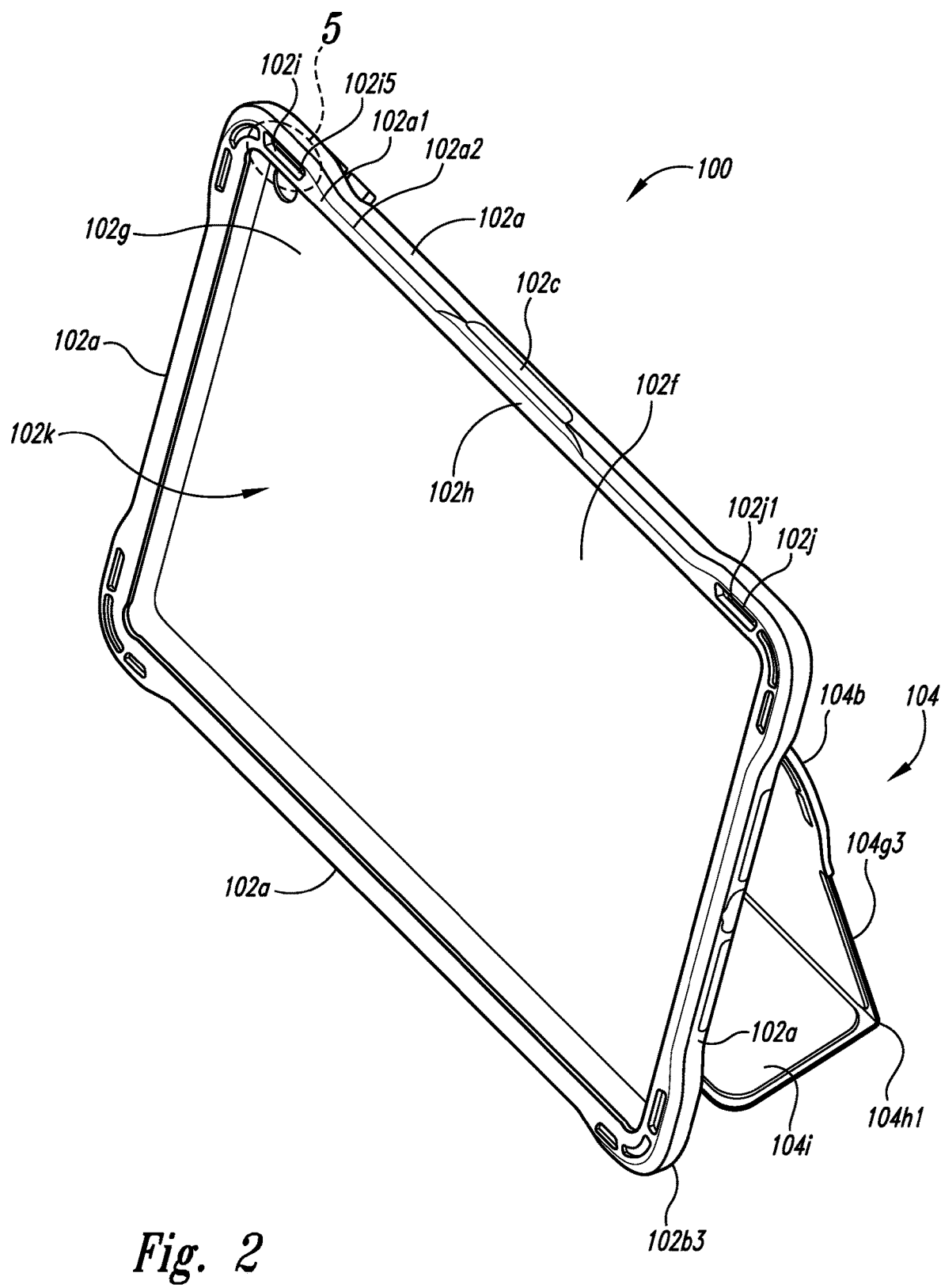
FIG. 2 is a front perspective view of the tablet case assembly in open-stand configuration of FIG. 1.

Turning to FIG. 2 depicted therein is a front perspective view of the tablet case assembly in open-stand configuration of FIG. 1 to include frame assembly periphery 102a, first frame coupler (e.g., frame assembly periphery groove) 102c, frame back 102f, frame back interior surface 102g, frame front plate 102h, fourth frame coupler (e.g., left frame socket) 102i, sixth frame coupler (e.g., right frame socket) 102j, and tablet receptacle portion 102k. The frame assembly periphery 102a is shown to include frame assembly periphery first face (e.g., frame assembly periphery rear face) 102a1 and frame assembly periphery second face (e.g., frame assembly periphery front face) 102a2.

Figure 3:
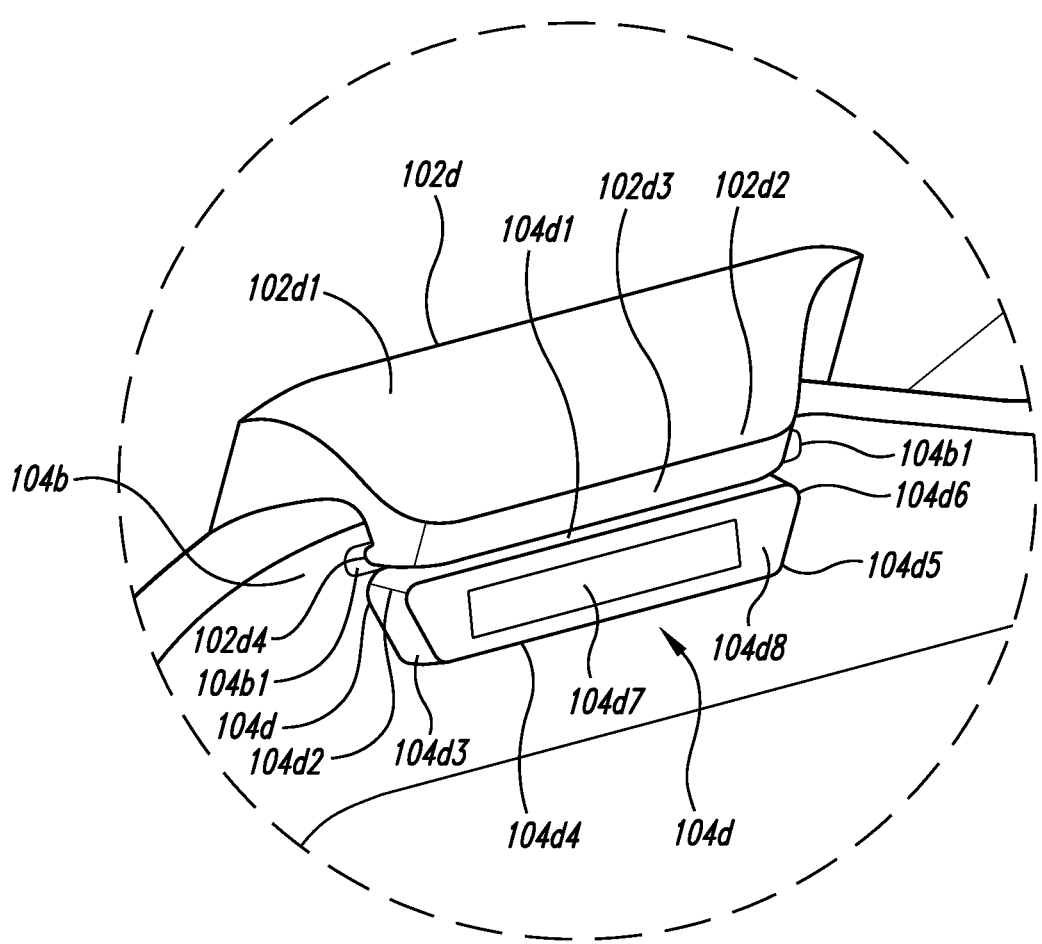
FIG. 3 is an enlarged portion of the rear perspective view of tablet case assembly in open-stand configuration as indicated by the dashed circle labeled "3" of FIG. 1.

Turning to FIG. 3 depicted therein is an enlarged portion of the rear perspective view of tablet case assembly in open-stand configuration as indicated by the dashed circle labeled "3" of FIG. 1 to include second frame coupler (e.g., left frame assembly hook) 102d, first cover coupler (e.g., left cover corner tab) 104b, and fifth cover coupler (e.g., left cover plug) 104d. The second frame coupler (e.g., left frame assembly hook) 102d is shown to include hook exterior upper surface 102d1, hook exterior front surface 102d2, hook exterior lower surface 102d3, and hook tip 102d4. The first cover coupler (e.g., left cover corner tab) 104b is shown to include second cover coupler (e.g., left cover groove) 104b1. The fifth cover coupler (e.g., left cover plug) 104d is shown to include upper portion 104d1, upper left corner portion 104d2, lower left corner portion 104d3, lower portion 104d4, lower right corner portion 104d5, upper right corner portion 104*d*6, sixth cover coupler (e.g., left cover plug magnet) 104*d*7, and plug face 104*d*8.

Figure 4:
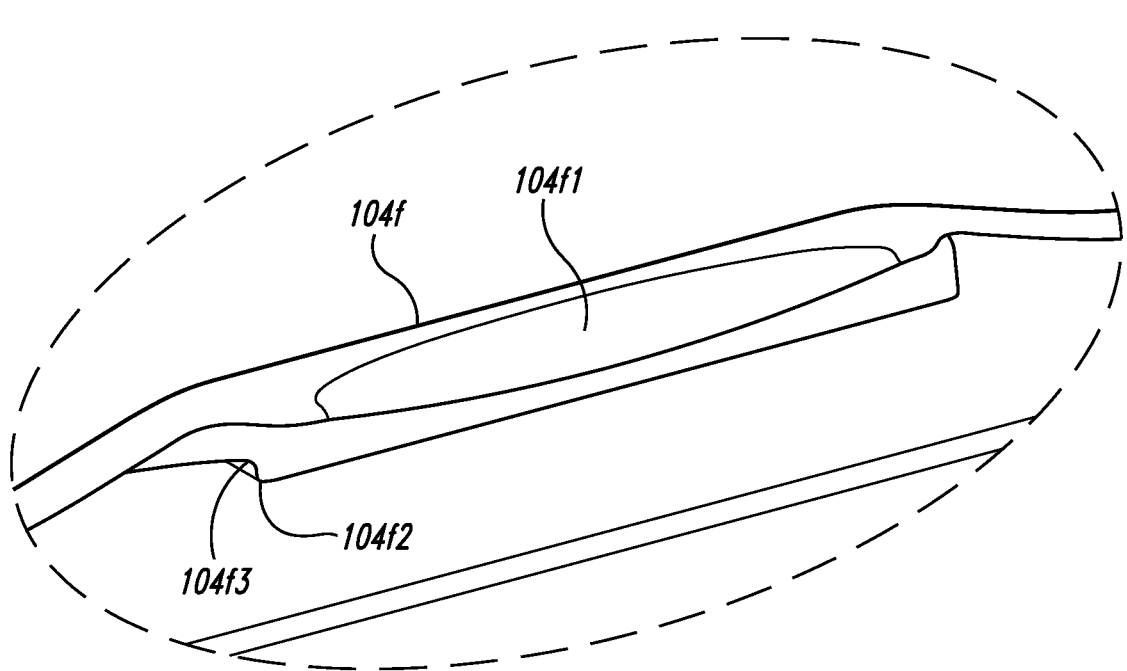
FIG. 4 is an enlarged portion of the rear perspective view of tablet case assembly in open-stand configuration as indicated by the dashed circle labeled "4" of FIG. 1.

Turning to FIG. 4 depicted therein is an enlarged portion of the rear perspective view of tablet case assembly in open-stand configuration as indicated by the dashed circle labeled "4" of FIG. 1 to include ninth cover coupler portion (e.g., cover hook) 104*f*. The ninth cover coupler portion (e.g., cover hook) 104*f* is shown to include upper hook surface 104*f*1, hook end 104*f*2, and hook gap 104*f*3.

Figure 5:
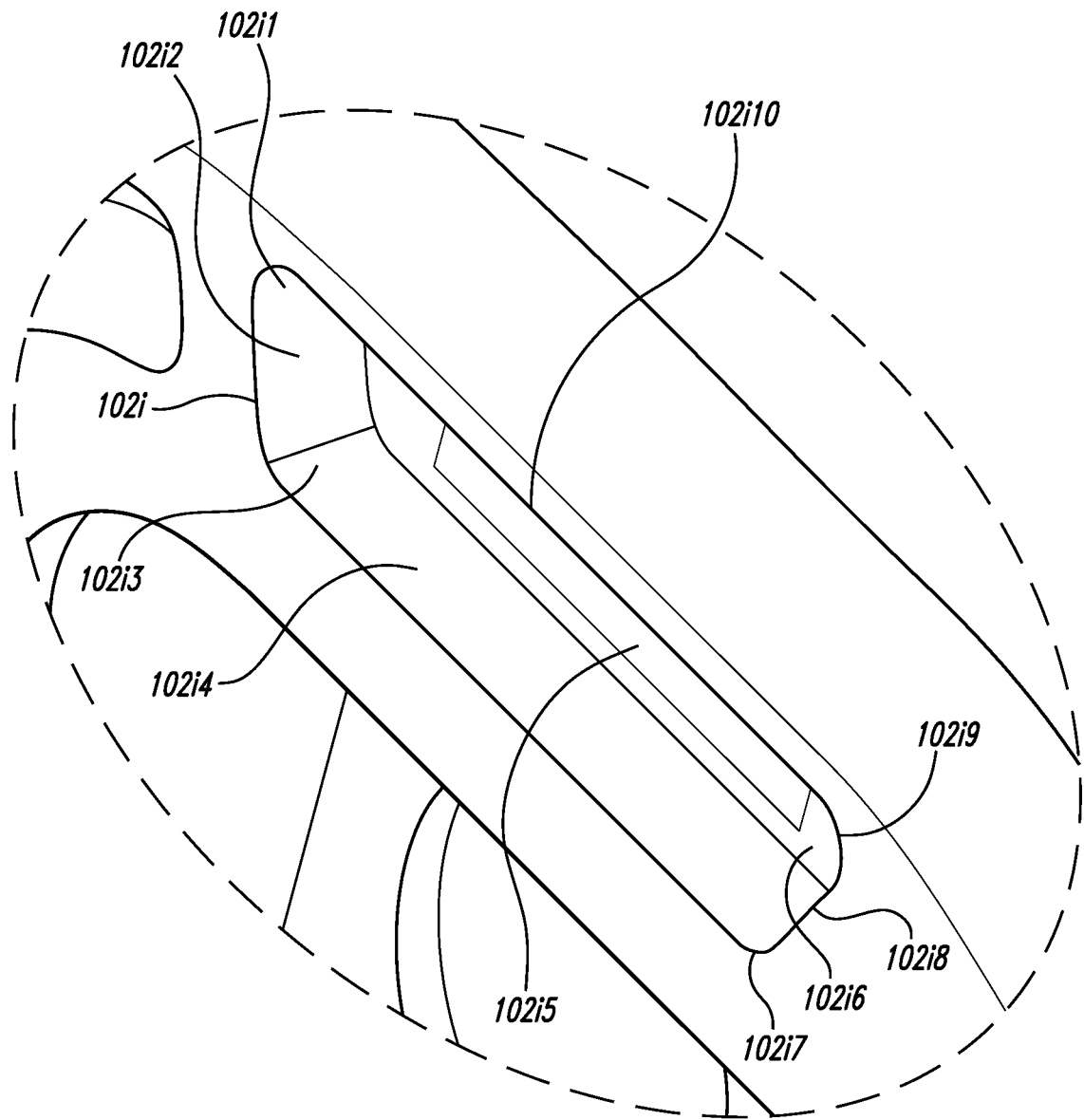
FIG. 5 is an enlarged portion of the front perspective view of tablet case assembly in open-stand configuration as indicated by the dashed circle labeled "5" of FIG. 2.

Turning to FIG. 5 depicted therein is an enlarged portion of the front perspective view of tablet case assembly in open-stand configuration as indicated by the dashed circle labeled "5" of FIG. 2 to include fourth frame coupler (e.g., left frame socket) 102*i*. The fourth frame coupler (e.g., left frame socket) 102*i* is shown to include upper left corner portion 102*i*1, left side portion 102*i*2, lower left corner portion 102*i*3, lower portion 102*i*4, fifth frame coupler (e.g., left frame socket magnet or non-magnetic metallic portion) 102*i*5, socket face 102*i*6, lower right corner portion 102*i*7, right side portion 102*i*8, upper right corner portion 102*i*9, and upper portion 102*i*10.

Figure 6:
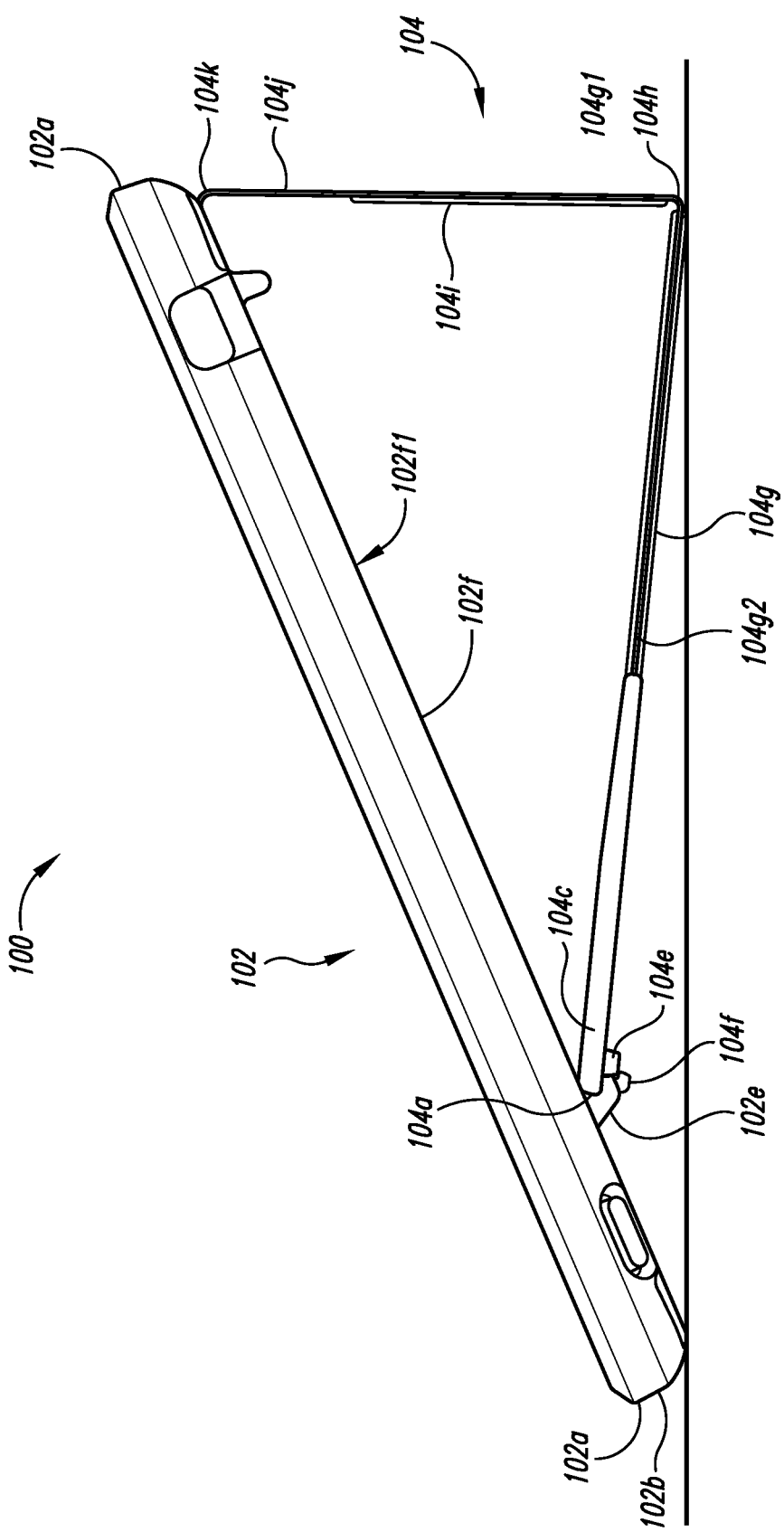
FIG. 6 is a side-elevational view of the tablet case assembly in open-stand configuration of FIG. 1.
Figure 7:
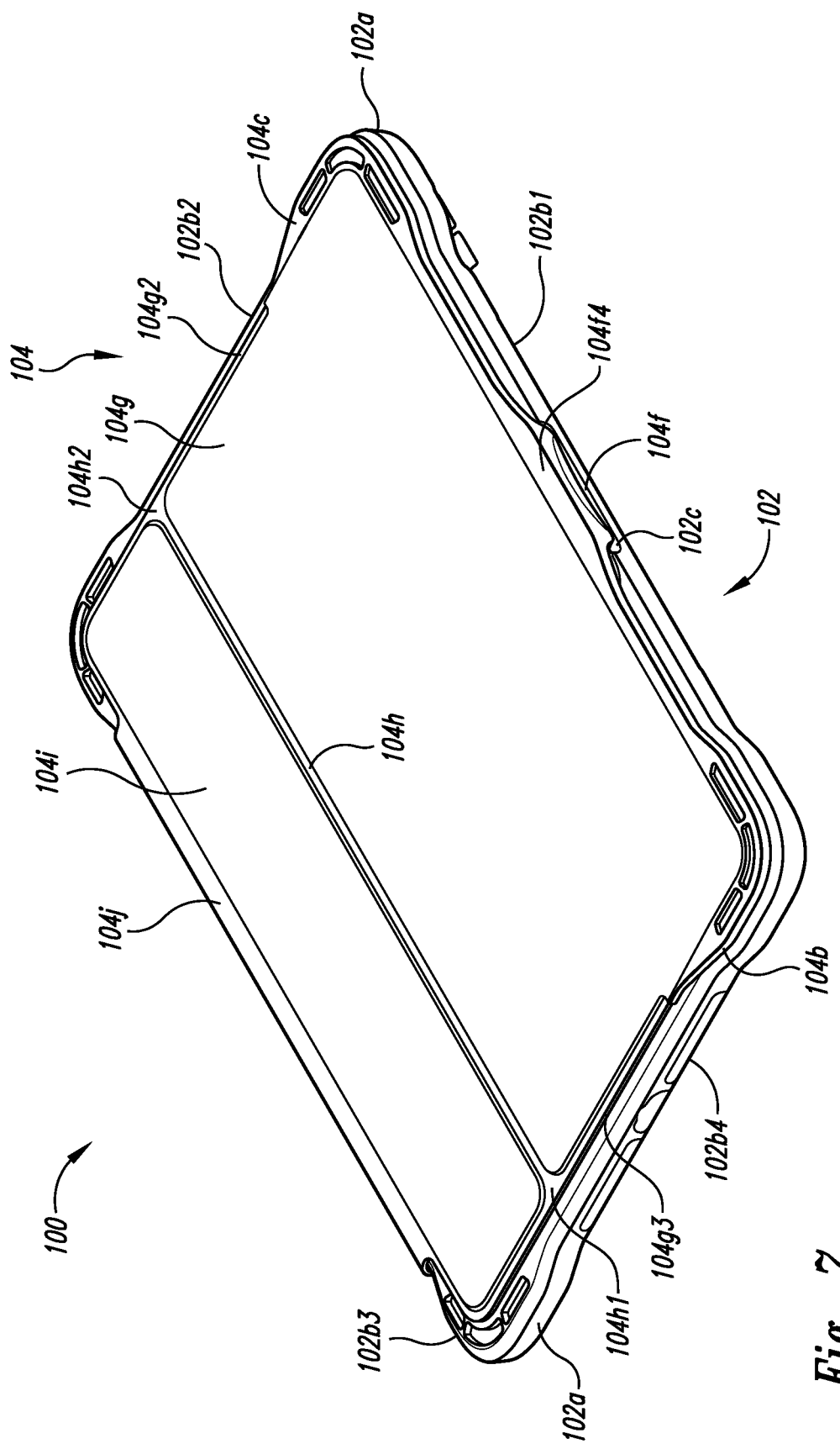
FIG. 7 is a front perspective view of the tablet case assembly of FIG. 1 in closed configuration.
Figure 8:
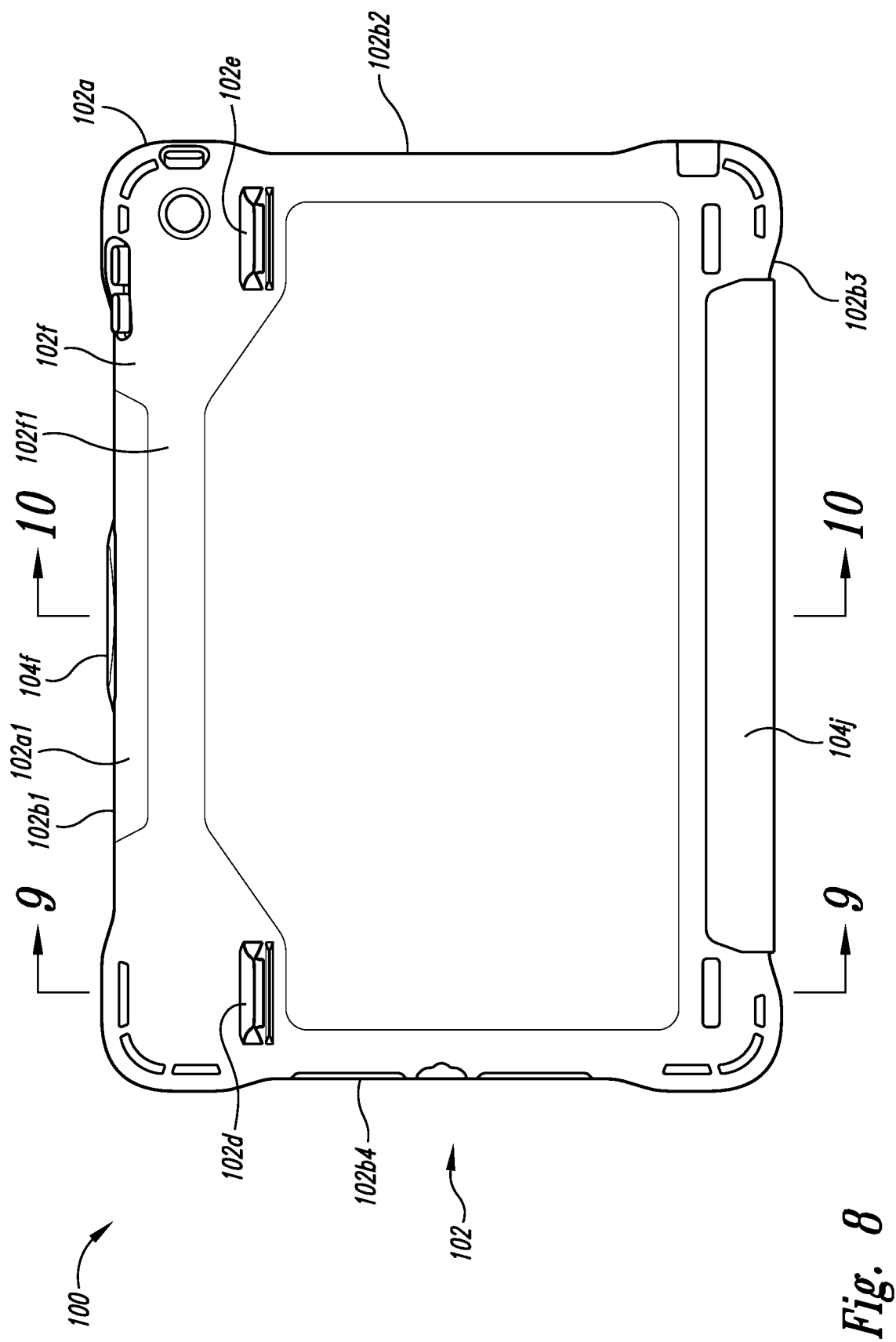
FIG. 8 is a rear top plan view of the tablet case assembly in closed configuration of FIG. 7.

Turning to FIG. 6 depicted therein is a side-elevational view of the tablet case assembly in open-stand configuration of FIG. 1. Turning to FIG. 7 depicted therein is a front perspective view of the tablet case assembly of FIG. 1 in closed configuration to include hook front face 104*f*4. Turning to FIG. 8 depicted therein is a rear top plan view of the tablet case assembly in closed configuration of FIG. 7.

Turning to FIG. 9 depicted therein is a cross-sectional view of the tablet case assembly in closed configuration taken along the 9-9 cut lines of FIG. 8 to include frame back interior surface 102*g*. Turning to FIG. 10 depicted therein is a cross-sectional view of the tablet case assembly in closed configuration taken along the 10-10 cut lines of FIG. 10.

Figure 11:
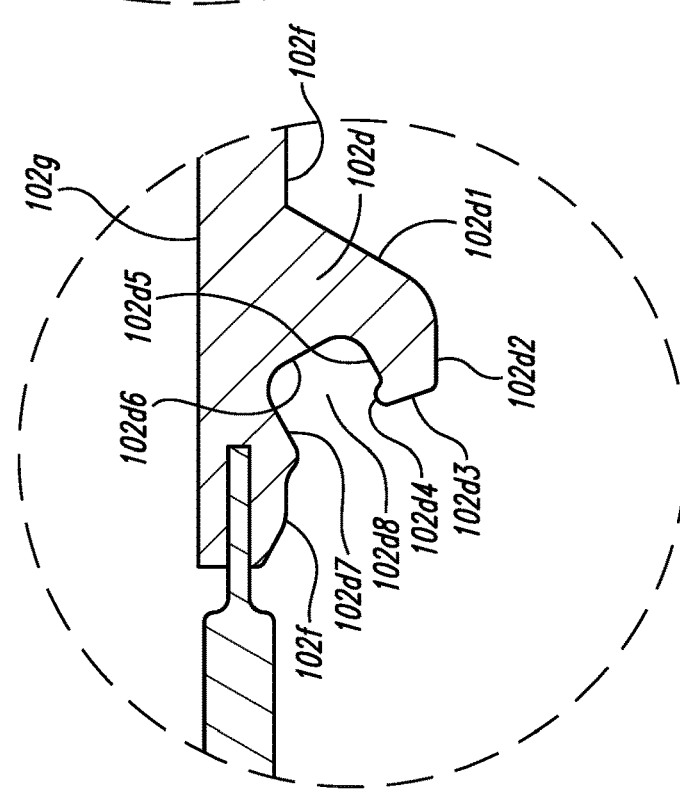
FIG. 11 is an enlarged portion of the cross-sectional view of tablet case assembly in closed configuration as indicated by the dashed circle labeled "11" of FIG. 9.

Turning to FIG. 11 depicted therein is an enlarged portion of the cross-sectional view of tablet case assembly in closed configuration as indicated by the dashed circle labeled "11" of FIG. 9 to include second frame coupler (e.g., left frame assembly hook) 102*d*, frame back 102*f*, and frame back interior surface 102*g*. The second frame coupler (e.g., left frame assembly hook) 102*d* is shown to include hook exterior upper surface 102*d*1, hook exterior front surface 102*d*2, hook exterior lower surface 102*d*3, hook tip 102*d*4, hook interior surface 102*d*5, hook rear surface 102*d*6, hook back surface 102*d*7, and hook gap area 102*d*8.

Figure 12:
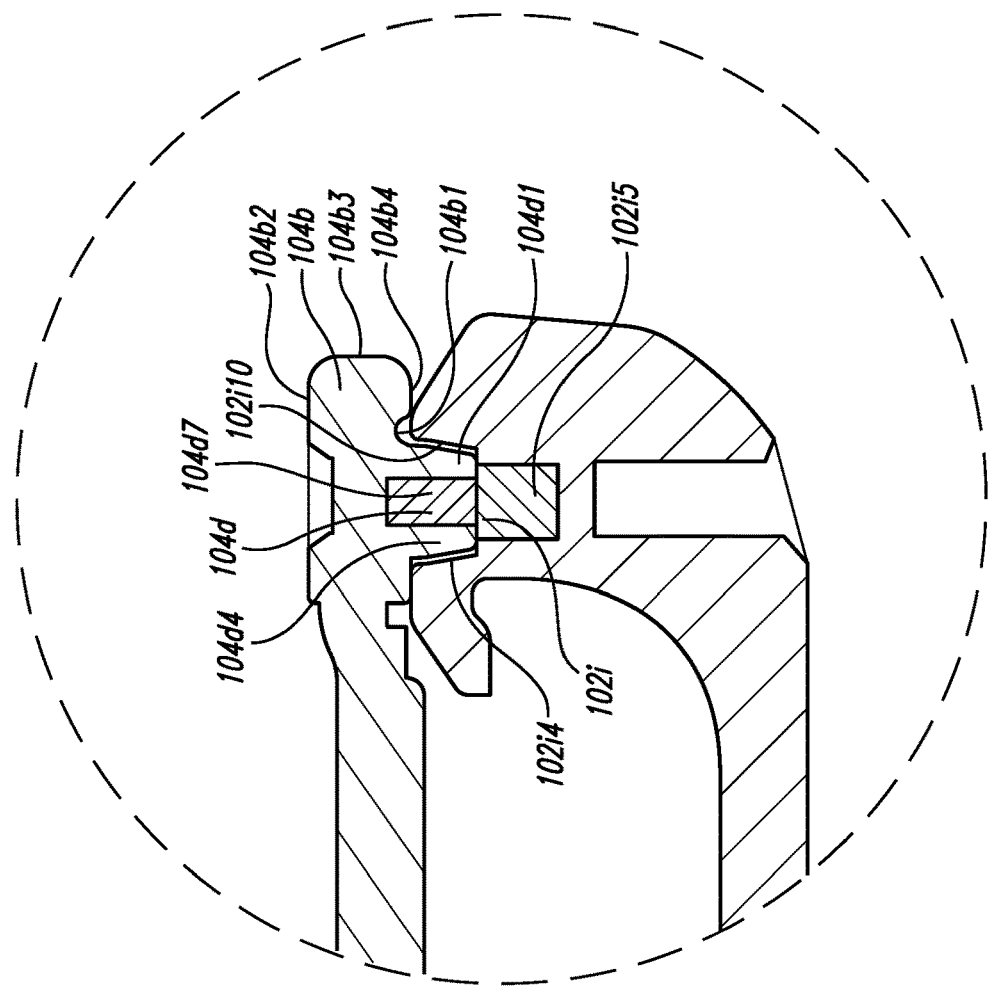
FIG. 12 is an enlarged portion of the cross-sectional view of tablet case assembly in closed configuration as indicated by the dashed circle labeled "12" of FIG. 9.

Turning to FIG. 12 depicted therein is an enlarged portion of the cross-sectional view of tablet case assembly in closed configuration as indicated by the dashed circle labeled "12" of FIG. 9 to include fourth frame coupler (e.g., left frame socket) 102*i*, first cover coupler (e.g., left cover corner tab) 104*b*, and fifth cover coupler (e.g., left cover plug) 104*d*. The fourth frame coupler (e.g., left frame socket) 102*i* is shown to include lower portion 102*i*4, fifth frame coupler (e.g., left frame socket magnet or non-magnetic metallic portion) 102*i*5, and upper portion 102*i*10. The first cover coupler (e.g., left cover corner tab) 104*b* is shown to include second cover coupler (e.g., left cover groove) 104*b*1, cover tab first side 104*b*2, cover tab second side (e.g., cover tab top side) 104*b*3, and cover tab third side 104*b*4. The fifth cover coupler (e.g., left cover plug) 104*d* is shown to include upper portion 104*d*1, lower portion 104*d*4, and sixth cover coupler (e.g., left cover plug magnet) 104*d*7.

Figure 13:
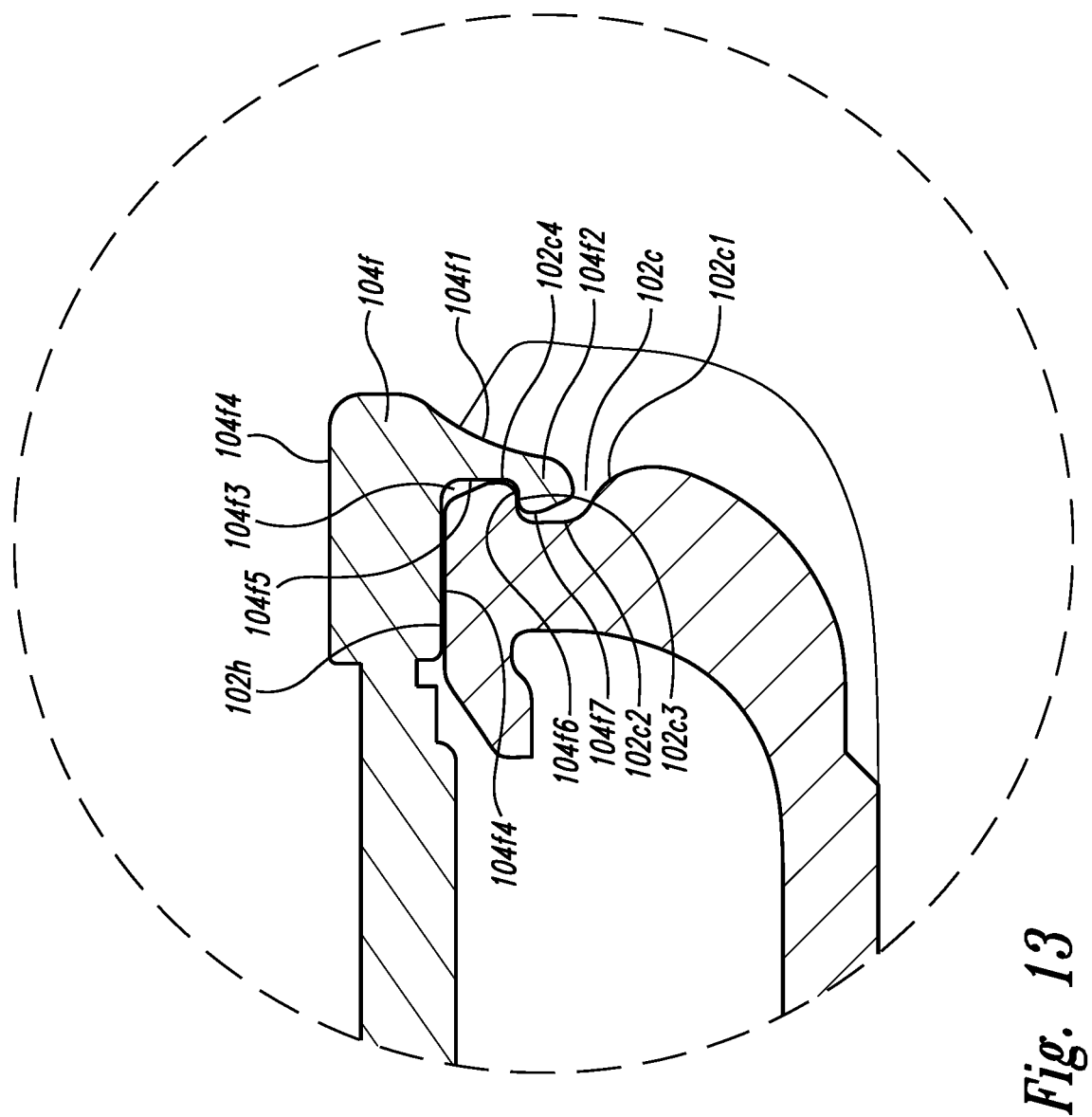
FIG. 13 is an enlarged portion of the cross-sectional view of tablet case assembly in closed configuration as indicated by the dashed circle labeled "13" of FIG. 10.

Turning to FIG. 13 depicted therein is an enlarged portion of the cross-sectional view of tablet case assembly in closed configuration as indicated by the dashed circle labeled "13" of FIG. 10 to include first frame coupler (e.g., frame assembly periphery groove) 102*c*, frame front plate 102*h*, and ninth cover coupler portion (e.g., cover hook) 104*f*. The first frame coupler (e.g., frame assembly periphery groove) 102*c* is shown to include rear groove wall 102*c*1, groove floor 102*c*2, front groove wall 102*c*3, and front ridge 102*c*4. The ninth cover coupler portion (e.g., cover hook) 104*f* is shown to include upper hook surface 104*f*1, hook end 104*f*2, hook gap 104*f*3, hook front face 104*f*4, hook back interior 104*f*5, hook right interior 104*f*6, and hook tip 104*f*7.

As shown by one or more of FIGS. 1-13, tablet case assembly 100 can include frame assembly 102, which can include frame assembly periphery 102*a* and a frame back 102*f*. The frame assembly periphery 102*a* can include frame assembly periphery first surface 102*a*1, frame assembly periphery second surface 102*a*2, and frame assembly periphery outer surface 102*b*. The frame assembly periphery outer surface 102*b* can include frame assembly periphery first outer side 102*b*1, frame assembly periphery second outer side 102*b*2, frame assembly periphery third outer side 102*b*3, and frame assembly periphery fourth outer side 102*b*4. The frame assembly periphery first outer side 102*b*1 is substantially perpendicular to frame assembly periphery second outer side 102*b*2 and to frame assembly periphery fourth outer side 102*b*4. The frame assembly periphery first outer side 102*b*1 is substantially parallel to the frame assembly periphery third outer side 102*b*3.

The frame back 102*f* can include frame back exterior surface 102*f*1, which is facing a first direction substantially as what the frame assembly periphery first surface 102*a*1 is facing and can include frame back interior surface 102*g*, which is facing a second direction substantially opposite to the first direction, the second direction substantially as what frame assembly periphery second surface 102*a*2 is facing. The frame assembly periphery 102*a* is bounding frame back interior surface 102*g* to together form tablet receptacle portion 102*k* sized and shaped to contain a tablet computing device.

The frame assembly 102 can include first frame coupler (e.g., frame assembly periphery groove) 102*c* as positioned along frame assembly periphery first outer side 102*b*1 of frame assembly periphery outer surface 102*b*. The frame assembly 102 can include second frame coupler (e.g., left frame assembly hook) 102*d* as positioned nearer to frame assembly periphery fourth outer side 102*b*4 than to frame assembly periphery second outer side 102*b*2. The second frame coupler (e.g., left frame assembly hook) 102*d* as extending from frame back exterior surface 102*f*1. The frame assembly 102 can include third frame coupler (e.g., right frame assembly hook) 102*e* as positioned nearer to frame assembly periphery second outer side 102*b*2 than to frame assembly periphery fourth outer side 102*b*4. The third frame coupler (e.g., right frame assembly hook) 102*e* is extending from frame back exterior surface 102*f*1.

The frame assembly 102 can include fourth frame coupler (e.g., left frame socket) 102*i* as positioned along frame assembly periphery second surface 102*a*2 nearer to frame assembly periphery second outer side 102*b*2 than to frame assembly periphery fourth outer side 102*b*4. The frame assembly 102 can include fifth frame coupler (e.g., left frame socket magnet or non-magnetic metallic portion) 102*i*5 as interiorly positioned within fourth frame coupler 102*i*. The frame assembly 102 can include sixth frame coupler (e.g., right frame socket) 102*j* as positioned along frame assembly periphery second surface 102*a*2 nearer to frame assembly periphery fourth outer side 102*b*4 than to frame assembly periphery second outer side 102*b*2. The frame assembly 102 can include seventh frame coupler (e.g., right frame socket magnet or non-magnetic metallic portion) 102*j*1 as interiorly positioned within the sixth frame coupler 102*j*.

The tablet case assembly 100 can include cover assembly 104, which can include first cover portion 104*g* and second cover portion 104*i*. The first cover portion 104*g* can include first side 104*g*1, second side 104*g*2 and third side 104*g*3. The first side 104*g*1 is substantially perpendicular to second side 104*g*2 and to third side 104*g*3. The cover assembly 104 can include first hinge 104*h*. The first side 104*g*1 is coupled with first hinge 104*h*. The first cover portion 104*g* can include cover end edge 104*a* positioned oppositely across first cover portion 104*g* from first side 104*g*1. The cover assembly 104 can include first cover coupler (e.g., left cover corner tab) 104*b* positioned substantially along cover end edge 104*a* nearer to third side 104*g*3 than to second side 104*g*2.

The cover assembly 104 can include second cover coupler (e.g., left cover groove) 104*b*1 positioned nearer to cover end edge 104*a* than to first side 104*g*1 and positioned nearer to third side 104*g*3 than to second side 104*g*2. The cover assembly 104 can include third cover coupler (e.g., right cover corner tab) 104*c* positioned substantially along cover end edge 104*a* nearer to second side 104*g*2 than to third side 104*g*3. The cover assembly 104 can include fourth cover coupler (e.g., right cover groove) 104*c*1 positioned nearer to cover end edge 104*a* than to first side 104*g*1 and positioned nearer to second side 104*g*2 than to third side 104*g*3. The cover assembly 104 can include fifth cover coupler (e.g., left cover plug) 104*d* positioned nearer to cover end edge 104*a* than to first side 104*g*1. The cover assembly 104 can include fifth cover coupler (e.g., left cover plug) 104*d* positioned nearer to third side 104*g*3 than to second side 104*g*2.

The cover assembly 104 can include sixth cover coupler (e.g., left cover plug magnet) 104*d*7 positioned nearer to cover end edge 104*a* than to first side 104*g*1 and positioned nearer to third side 104*g*3 than to second side 104*g*2. The sixth cover coupler (e.g., left cover plug magnet) 104*d*7 is interiorly positioned within fifth cover coupler 104*d*. The cover assembly 104 can include seventh cover coupler (e.g., right cover plug) 104*e* positioned nearer to cover end edge 104*a* than to first side 104*g*1 and positioned nearer to second side 104*g*2 than to third side 104*g*3. The cover assembly 104 can include eighth cover coupler (e.g., right cover plug magnet) 104*e*1 positioned nearer to the cover end edge 104*a* than to the first side 104*g*1 and positioned nearer to the second side 104*g*2 than to the third side 104*g*3. The eighth cover coupler (e.g., right cover plug magnet) 104*e*1 is interiorly positioned within the seventh cover coupler second cover plug 104*e*. The cover assembly 104 can include ninth cover coupler (e.g., cover hook) 104*f* positioned substantially along the cover end edge 104*a* between the third side 104*g*3 and the second side 104*g*2.

In implementations, frame assembly 102 and cover assembly 104 can be configured to couple together to form a closed configuration wherein the cover assembly 104 substantially covers tablet receptacle portion 102*k* of frame assembly 102. The closed configuration can include first frame coupler 102*c* and ninth cover coupler 104*f* being coupled together, fourth frame coupler 102*i* and seventh cover coupler second cover plug 104*e* being coupled together, fifth frame coupler 102*i*5 and eighth cover coupler 104*e*1 being coupled together, sixth frame coupler 102*j* and fifth cover coupler 104*d* being coupled together, and seventh frame coupler 102*j*1 and sixth cover coupler 104*d*7 being coupled together.

In implementations, frame assembly 102 and cover assembly 104 are configured to couple together to form a stand configuration wherein cover assembly 104 substantially forms a stand to support frame assembly 102. The stand configuration can include second frame coupler 102*d* and second cover coupler 104*b*1 being coupled together, third frame coupler 102*e* and fourth cover coupler being coupled together, second frame coupler 102*d* and first cover coupler 104*b* being coupled together, and third frame coupler 102*e* and third cover coupler 104*c* being coupled together.

In implementations fourth frame coupler 102*i* can include a socket; fifth frame coupler 102*i*5 can include a magnet or non-magnetic metallic portion; first cover coupler 104*b* can include a tab sized and shaped to engage with the second frame coupler 102*d*; second cover coupler 104*b*1 can include a groove sized and shaped to engage with the second frame coupler 102*d*; second frame coupler 102*d* can include a hook; fifth cover coupler 104*d* can include a plug sized and shaped to engage with the sixth frame coupler 102*j* as a socket; sixth cover coupler 104*d*7 can include a magnet sized and shaped to engage with the seventh frame coupler 102*j*1 as a magnet or non-magnetic metallic portion; ninth cover coupler 104*f* can include a hook sized and shaped to engage with the first frame coupler 102*c*; first frame coupler 102*c* can include a longitudinal groove.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A tablet case assembly comprising:
    (I) a frame assembly including
        (A) a frame assembly periphery and
        (B) a frame back,
        the frame assembly periphery including
            (i) a frame assembly periphery first surface,
            (ii) a frame assembly periphery second surface, and
            (iii) a frame assembly periphery outer surface,
            the frame assembly periphery outer surface including
                (a) a frame assembly periphery first outer side,
                (b) a frame assembly periphery second outer side,
                (c) a frame assembly periphery third outer side, and
                (d) a frame assembly periphery fourth outer side,
                the frame assembly periphery first outer side perpendicular to the frame assembly periphery second outer side and to the frame assembly periphery fourth outer side, the frame assembly periphery first outer side parallel to the frame assembly periphery third outer side,
        the frame back including
            (i) a frame back exterior surface facing a first direction as what the frame assembly periphery first surface is facing and
            (ii) a frame back interior surface facing a second direction substantially opposite to the first direction, the second direction as what the frame assembly periphery second surface is facing, the frame assembly periphery bounding the frame back interior surface to together form a tablet receptacle portion sized and shaped to contain a tablet computing device,
        the frame assembly further including
            (C) a first frame coupler positioned along the frame assembly periphery first outer side of the frame assembly periphery outer surface,
            (D) a second frame coupler positioned nearer to the frame assembly periphery fourth outer side than to the frame assembly periphery second outer side, the second frame coupler extending from the frame back exterior surface,
            (E) a third frame coupler positioned nearer to the frame assembly periphery second outer side than to the frame assembly periphery fourth outer side, the third frame coupler extending from the frame back exterior surface,
            (F) a fourth frame coupler positioned along the frame assembly periphery second surface nearer to the frame assembly periphery second outer side than to the frame assembly periphery fourth outer side,
            (G) a fifth frame coupler interiorly positioned within the fourth frame coupler,
            (H) a sixth frame coupler positioned along the frame assembly periphery second surface nearer to the frame assembly periphery fourth outer side than to the frame assembly periphery second outer side, and
            (I) a seventh frame coupler, interiorly positioned within the sixth frame coupler; and
    (II) a cover assembly including
        (A) a first cover portion and
        (B) a second cover portion,
        the first cover portion including
            (i) a first side,
            (ii) a second side and
            (iii) a third side, the first side being perpendicular to the second side and to the third side,
        the cover assembly further including
            (C) a first hinge, the first side coupled with the first hinge,
        the first cover portion further including
            (iv) a cover end edge positioned oppositely across the first cover portion from the first side,
        the cover assembly further including
            (D) a first cover coupler positioned along the cover end edge nearer to the third side than to the second side,
            (E) a second cover coupler positioned nearer to the cover end edge than to the first side, the second cover coupler positioned nearer to the third side than to the second side,
            (F) a third cover coupler portion positioned along the cover end edge nearer to the second side than to the third side,
            (G) a fourth cover coupler portion positioned nearer to the cover end edge than to the first side, the fourth cover coupler portion positioned nearer to the second side than to the third side,
            (H) a fifth cover coupler positioned nearer to the cover end edge than to the first side, the fifth cover coupler positioned nearer to the third side than to the second side,
            (I) a sixth cover coupler positioned nearer to the cover end edge than to the first side, the sixth cover coupler positioned nearer to the third side than to the second side, the sixth cover coupler interiorly positioned within the fifth cover coupler, (J) a seventh cover coupler positioned nearer to the cover end edge than to the first side, the seventh cover coupler positioned nearer to the second side than to the third side, (K) an eighth cover coupler positioned nearer to the cover end edge than to the first side, the eighth cover coupler positioned nearer to the second side than to the third side, the eighth cover coupler interiorly positioned within the seventh cover coupler, and (L) a ninth cover coupler portion positioned along the cover end edge between the third side and the second side, wherein the frame assembly and the cover assembly are configured to couple together to form a closed configuration wherein the cover assembly covers the tablet receptacle portion of the frame assembly, the closed configuration including the first frame coupler and the ninth cover coupler portion being coupled together, the fourth frame coupler and the seventh cover coupler being coupled together, the fifth frame coupler and the eighth cover coupler being coupled together, the sixth frame coupler and the fifth cover coupler being coupled together, and the seventh frame coupler and the sixth cover coupler being coupled together.

2. The tablet case assembly of claim 1 wherein the fourth frame coupler includes a socket.

3. The tablet case assembly of claim 1 wherein the fifth frame coupler includes a non-magnetic metallic portion.

4. The tablet case assembly of claim 1 wherein the first cover coupling portion includes a tab sized and shaped to engage with the second frame coupler.

5. The tablet case assembly of claim 4 wherein the second cover coupler portion includes a groove sized and shaped to engage with the second frame coupler.

6. The tablet case assembly of claim 5 wherein the second frame coupler includes a hook.

7. The tablet case assembly of claim 1 wherein the fifth cover coupler includes a plug sized and shaped to engage with the sixth frame coupler as a socket.

8. The tablet case assembly of claim 1 wherein the sixth cover coupler includes a magnet sized and shaped to engage with the seventh frame coupler as a non-magnetic metallic portion.

9. The tablet case assembly of claim 1 wherein the ninth cover coupler portion includes a hook sized and shaped to engage with the first frame coupler.

10. The tablet case assembly of claim 9 wherein the first frame coupler includes a longitudinal groove.

11. A tablet case assembly comprising:
(I) a frame assembly including
  (A) a tablet receptacle portion sized and shaped to contain a tablet computing device,
  (B) a first frame coupler,
  (C) a fourth frame coupler,
  (D) a fifth frame coupler interiorly positioned within the fourth frame coupler,
  (E) a sixth frame coupler and
  (F) a seventh frame coupler interiorly positioned within the sixth frame coupler; and
(II) a cover assembly including
  (A) a fifth cover coupler,
  (B) a sixth cover coupler interiorly positioned within the fifth cover coupler,
  (C) a seventh cover coupler, an eighth cover coupler interiorly positioned within the seventh cover coupler, and
  (D) a ninth cover coupler portion,
wherein the cover assembly covers the tablet receptacle portion of the frame assembly in a closed configuration, the closed configuration including the first frame coupler and the ninth cover coupler portion being snap coupled together, the fourth frame coupler and the seventh cover coupler being coupled together by the seventh cover coupler being at least partially positioned interiorly to the fourth frame coupler, the fifth frame coupler and the eighth cover coupler being magnetically coupled together, the sixth frame coupler and the fifth cover coupler being coupled together by the fifth cover coupler being at least partially positioned interiorly to the sixth frame coupler, and the seventh frame coupler and the sixth cover coupler being magnetically coupled together.

12. The tablet case assembly of claim 11 wherein the fourth frame coupler includes a socket, the fifth frame coupler includes a non-magnetic metallic portion, and the sixth cover coupler includes a magnet sized and shaped to engage with the seventh frame coupler, the seventh frame coupler including a non-magnetic metallic portion.

13. The tablet case assembly of claim 11 wherein the fifth cover coupler includes a plug sized and shaped to engage with the sixth frame coupler as a socket.

14. The tablet case assembly of claim 13 wherein the ninth cover coupler portion includes a hook sized and shaped to engage with the first frame coupler, the first frame coupler including a longitudinal groove.

\* \* \* \* \*